(12) United States Patent  
Chen et al.

(10) Patent No.: US 7,801,203 B2  
(45) Date of Patent: Sep. 21, 2010

(54) CLOCK AND DATA RECOVERY CIRCUITS

(75) Inventors: Yung-Tai Chen, Hsinchu (TW); Hsin-Hsien Li, Hsinchu (TW)

(73) Assignee: Trendchip Technologies, Corp., Hsinchu (TW)

( * ) Notice: Subject to any disclaimer, the term of this patent is extended or adjusted under 35 U.S.C. 154(b) by 573 days.

(21) Appl. No.: 11/841,922

(22) Filed: Aug. 20, 2007

(65) Prior Publication Data

US 2009/0052600 A1    Feb. 26, 2009

(51) Int. Cl.
*H04B 1/38* (2006.01)
*H04L 7/02* (2006.01)
*H04L 25/00* (2006.01)

(52) U.S. Cl. .......................... 375/219; 375/359; 375/371

(58) Field of Classification Search .................. 375/219, 375/220, 356, 359, 371, 373, 375, 376
See application file for complete search history.

(56) References Cited

U.S. PATENT DOCUMENTS

2004/0068682 A1\* 4/2004 Takei et al. .................. 714/700
2004/0125902 A1\* 7/2004 Nishimura et al. .......... 375/371
2008/0273647 A1\* 11/2008 Segaram ..................... 375/371

\* cited by examiner

*Primary Examiner*—Don N Vo
(74) *Attorney, Agent, or Firm*—Alston & Bird LLP

(57) ABSTRACT

A data communication system comprising a first transmitter set configured to transmit a first output based on a first signal, the first output including one of a training pattern and a first data, the training pattern and the first data including clock information, a second transmitter set configured to transmit a second output based on the first signal, the second output including one of the training pattern and a second data, a first receiver set configured to generate a first received data based on the first output, a second receiver set configured to generate a second received data based on the second output, a clock and data recovery (CDR) circuit configured to extract the clock information based on the first signal and the first received data and provide a second signal indicating whether a frequency in-lock status is reached, a phase control circuit in the second receiver set, the phase control circuit being configured to detect a phase difference between the first received data and the second received data and provide a third signal indicating whether a phase in-lock status is reached, and a detector configured to generate the first signal based on the second signal and the third signal.

34 Claims, 13 Drawing Sheets

CLOCK AND DATA RECOVERY CIRCUITS

BACKGROUND OF THE INVENTION

The present invention relates generally to synchronization of clock and data signals and, more particularly, to circuits capable of clock and data recovery.

Communication systems may transport large amounts of data at very high data rates. The transportation of data within communication systems may typically be governed by one or more standards that ensure the reliability of data transfer and the integrity of data conveyances. In accordance with such standards, many system components and end user devices of a communication system transport data via serial transmission paths. For example, a variety of Ethernet standards have been developed for serial data transmissions within a communication system at data rates of 10 megabits per second, 100 megabits per second, 1 gigabit per second and beyond. Internally, however, the system components and end user devices of the communication system may process data in a parallel manner. Accordingly, each receiving system component and end user device may be required to receive the serial data and convert the serial data into parallel data without loss of information.

A clock and data recovery (CDR) receiver may be used for accurate recovery of information from high-speed serial transmissions. FIG. 1A is a block diagram of a conventional serializer/deserializer (SERDES) system 10. Referring to FIG. 1A, the SERDES system 10 may include a phase-locked loop (PLL) clock system 16 at a transmitter side, a clock/data recovery (CDR) 18 at a receiver side, and a number of SERDES sets 10-1 to 10-N corresponding to a number of channels 11-1 to 11-N, N being a natural number. The clock system 16, which is common to the SERDES sets 10-1 to 10-N, may provide a system clock based on a reference clock. The CDR 18, which is also common to the SERDES sets 10-1 to 10-N, may provide a clock signal and a recovered system clock. Each of the SERDES sets 10-1 to 10-N may be configured to convert parallel data to serial data and vice versa in one of the corresponding channels 11-1 to 11-N.

In operation, as an example of the SERDES set 10-1, data to be transmitted from a transmitter that include bit 0 to bit 7, denoted as TX [7:0], are sent to an encoder 12. The encoder 12 may include a "pseudo random binary system" (PRBS)-format encoder based on an 8B/10B encoding scheme. That is, the 8-bit parallel data TX [7:0] may be encoded into 10-bit parallel data. Likewise, in each the SERDES sets 10-2 to 10-N, two additional bits are required for every eight bits of data to be transmitted, which disadvantageously aggravates the transmission overload. The 10-bit parallel data may be sent to a serializer 13 such as, for example, a multiplexer. The serializer 13 may convert the parallel data into serial data based on the system clock from the clock system 16. A driver 14 such as, for example, a low-voltage differential signaling (LVDS) device, may then send differential serial data via the corresponding external channel 11-1 such as, for example, multiple wires, to a receiver 24. The receiver 24, which may include an LVDS device, converts the differential serial data into serial data. A re-sampling circuit 15 including, for example, data flip flops (DFF), may sample the serial data based on a clock signal from a phase interpolator 17. A de-serializer 23 such as a de-multiplexer may convert serial data from the re-sampling circuit 15 into 10-bit parallel data based on the clock signal from the interpolator 17. A decoder 22 such as, for example, a PRBS-format decoder, may convert the 10-bit parallel data into 8-bit parallel data RX [7:0].

The clock signal provided by the phase interpolator 17 and the clock signal provided by the CDR 18 may have the same frequency but different phases. Generally, a CDR like the CDR 18 may suffer from extreme sensitivity to clock skew between clock domains within the CDR. FIG. 1B is a schematic diagram illustrating the issue of clock skew. Referring to FIG. 1B, serial data such as DATA 1 and DATA 2 may have substantially the same frequency and phase when transmitted at a transmitter side. These serial data may be transmitted over different channels 11-1 and 11-2 and, when received at a receiver side, may have the same frequency but may be out of phase with respect to one another due to, for example, different parasitic effects generated during transmission over the different channels 11-1 and 11-2. Such a phase shift is referred to as a clock skew. Because a CDR may be required to generate recovered clock edges which are ideally located to allow registration of the incoming data at a point of maximum signal quality, given the high-speed nature of the CDR and the relatively low noise margin, even minor errors in the alignment of clock edges to data availability may result in erroneous data being captured. To alleviate the issue of clock skew, a delay locked loop (DLL) and a relatively large memory may be employed in the phase interpolator 17. The DLL may be as large as a PLL and the memory may include a great number of logic circuits, which may significantly increase the device size and hamper the miniaturization of a CDR receiver.

BRIEF SUMMARY OF THE INVENTION

Examples of the present invention may provide a data communication system comprising a first transmitter set configured to transmit a first output based on a first signal, the first output including one of a training pattern and a first data, the training pattern and the first data including clock information, a second transmitter set configured to transmit a second output based on the first signal, the second output including one of the training pattern and a second data, a first receiver set configured to generate a first received data based on the first output, a second receiver set configured to generate a second received data based on the second output, a clock and data recovery (CDR) circuit configured to extract the clock information based on the first signal and the first received data and provide a second signal indicating whether a frequency in-lock status is reached, a phase control circuit in the second receiver set, the phase control circuit being configured to detect a phase difference between the first received data and the second received data and provide a third signal indicating whether a phase in-lock status is reached, and a detector configured to generate the first signal based on the second signal and the third signal.

Some examples of the present invention may also provide a data communication system comprising a number of serializer de-serializer (SERDES) sets each including a transmitter set further comprising a serializer and a receiver set further comprising a de-serializer, a first transmitter set of a first SERDES set, the first transmitter being configured to transmit one of a training pattern and a first data, the training pattern and the first data including clock information, a second transmitter set of each of the remaining SERDES sets, the second transmitter set being configured to transmit one of the training pattern and a second data, a first receiver set of the first SERDES set corresponding to the first transmitter set, the first receiver set including a first delay circuit being configured to generate a first delayed data based on the one of the training pattern and the first data, a second receiver set of each of the remaining SERDES sets corresponding to the second transmitter set, the second receiver set including a second delay circuit being configured to generate a second delayed data based on the one of the training pattern and the second data, a clock and data recovery (CDR) circuit configured to extract the clock information based on the first delayed data, and a phase control circuit in the second receiver set, the phase control circuit being configured to detect a phase difference between the first delayed data and the second delayed data and provide a control code to the second delay circuit based on the phase difference.

Examples of the present invention may further provide a data communication system comprising a first transmitter set configured to transmit a first output including one of a training pattern and a first data, the training pattern and the first data including clock information, a second transmitter set configured to transmit a second output including one of the training pattern and a second data, a first receiver set comprising a first receiver configured to receive the first output, and a first delay circuit configured to generate a first delayed data, and a second receiver set comprising a second receiver configured to receive the second output, a second delay circuit configured to generate a second delayed data, and a phase control circuit configured to detect a phase difference between the first delayed data and the second delayed data and provide a control code to the second delay circuit based on the phase difference.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

Figure 2:
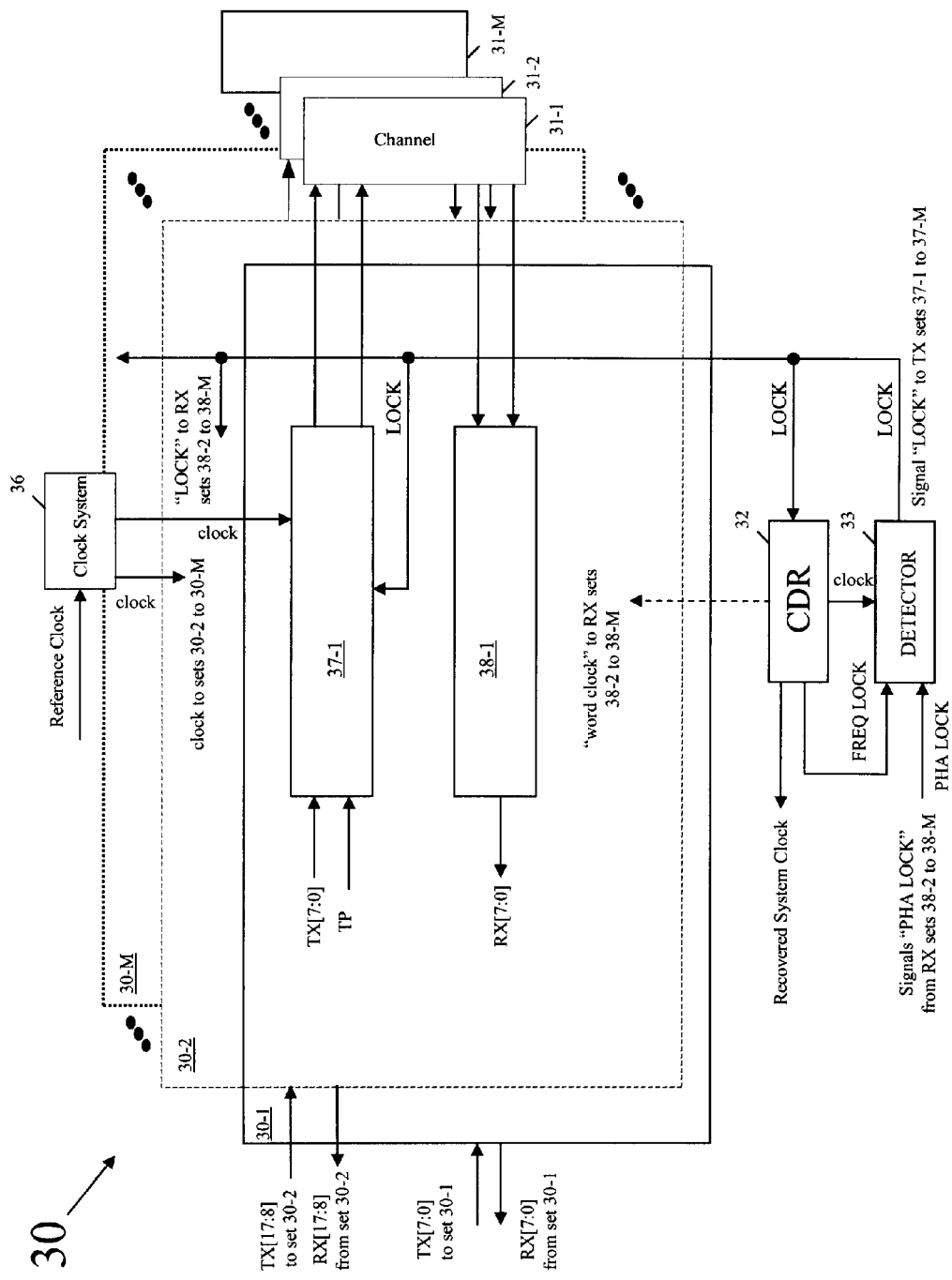
FIG. 2 is a schematic block diagram of a SERDES system consistent with an example of the present invention.

FIG. 2 is a schematic block diagram of a serializer/deserializer (SERDES) system 30 consistent with an example of the present invention. Referring to FIG. 2, the SERDES system 30 may include a clock system 36, a clock/data recovery (CDR) 32, a detector 33 and a number of SERDES sets 30-1 to 30-M corresponding to a number of channels 31-1 to 31-M, M being a natural number. The clock system 36, which is common to the SERDES sets 30-1 to 30-M, may provide a system clock or master clock based on a reference clock. The system clock may be provided by, for example, a phase-locked loop (PLL) at a transmitter side. The CDR 32, which may be provided at a receiver side, may be configured to provide a signal "FREQ LOCK" to the detector 33. The signal FREQ LOCK may indicate whether a frequency lock state is achieved. The detector 33, which may be also provided at the receiver side, may be configured to provide a signal "LOCK" to the SERDES sets 30-1 to 30-M. The signal LOCK may indicate whether both a frequency lock state and a phase lock state are achieved. The CDR 32 and the detector 33 will be further discussed in paragraphs below.

Figure 1A:
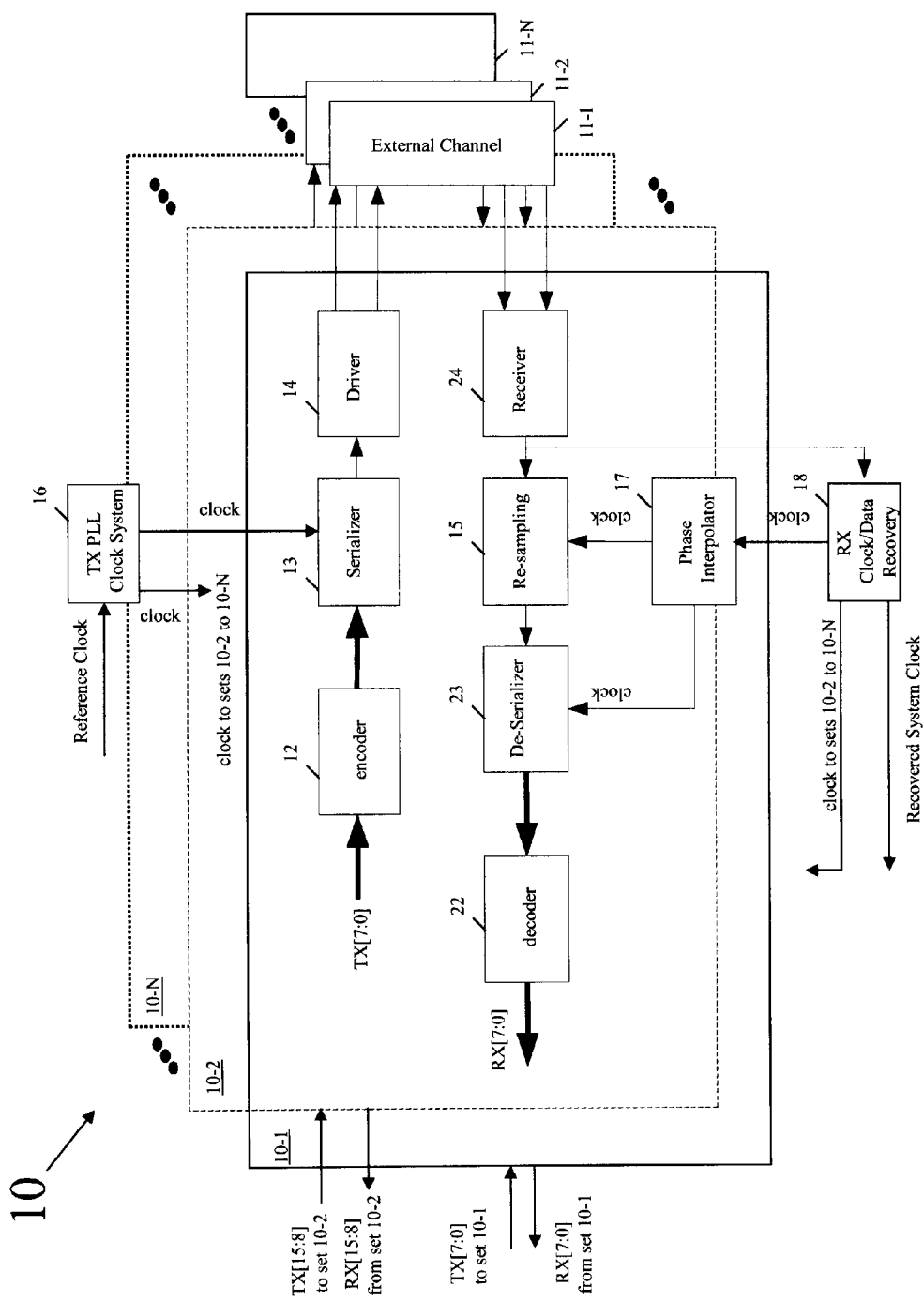
FIG. 1A is a block diagram of a conventional serializer/deserializer (SERDES) system.
Figure 1B:
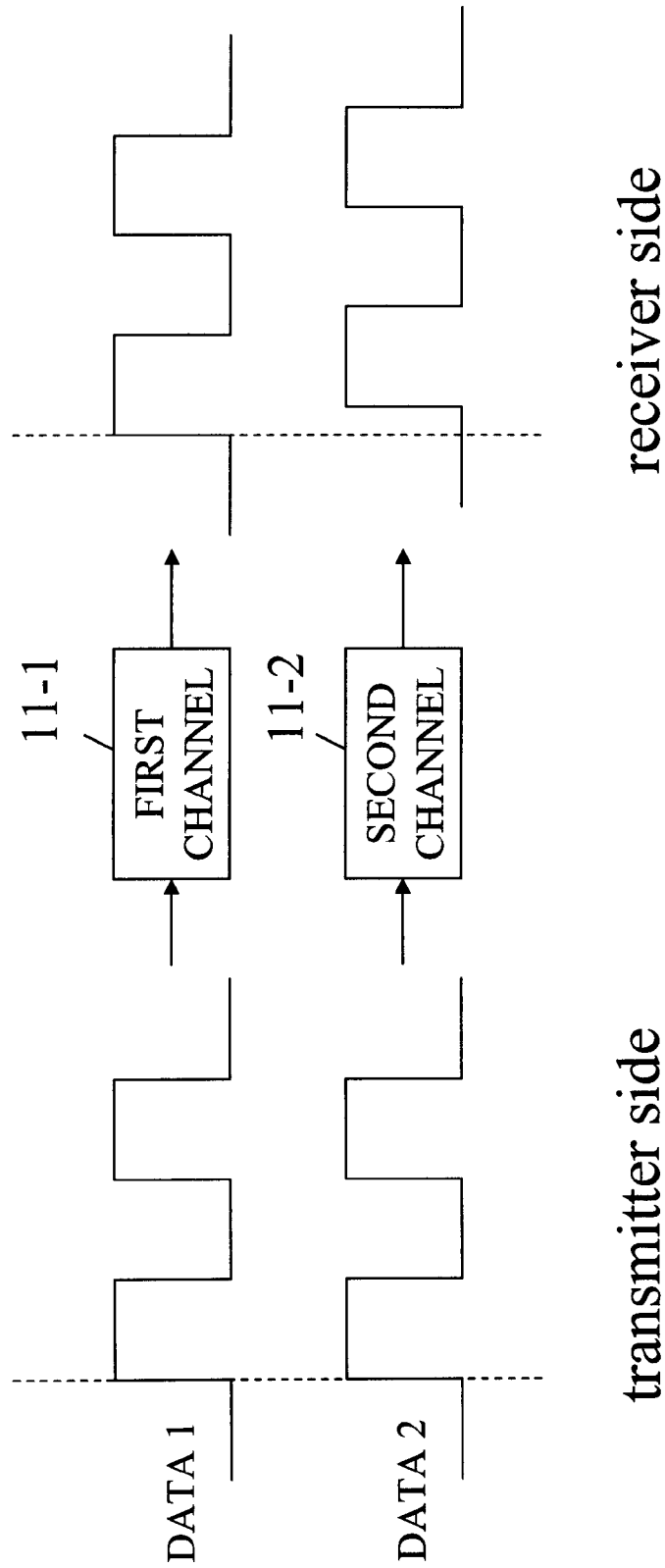
FIG. 1B is a schematic diagram illustrating the issue of clock skew.

Each of the SERDES sets 30-1 to 30-M may include a transmitter set and a receiver set. For example, the SERDES set 30-1 may include a transmitter set 37-1 and a receiver set 38-1. Similarly, the SERDES set 30-2 may include a transmitter set 37-2 and a receiver set 38-2, and the SERDES set 30-M may include a transmitter set 37-M and a receiver set 38-M. In each of the transmitter sets 37-1 to 37-M, an encoding device like the encoder 12 illustrated in FIG. 1A may be eliminated. Likewise, in each of the receiver sets 38-1 to 38-M, a decoding device like the decoder 22 illustrated in FIG. 1A may be eliminated. Each of the transmitter sets 37-1 to 37-M may be configured to convert parallel data to serial data and transmit the serial data to a corresponding one of the channels 31-1 to 31-M via, for example, a corresponding one of multiple wires. Each of the receiver sets 38-1 to 38-M may be configured to receive serial data from a corresponding one of the channels 31-1 to 31-M and convert the serial data back to parallel data. Furthermore, based on the signal LOCK from the detector 33, each of the transmitter sets 37-1 to 37-M may select between a training pattern "TP" and actual data to be transmitted. The training pattern TP may include a train of clock signals having a greater period than the system clock.

Moreover, in one example according to the present invention, at least the receiver sets 38-2 to 38-M may each be configured to provide a signal "PHA LOCK" to the detector 33 based on the signal LOCK. The signal PHA LOCK may indicate whether a phase lock state is achieved. The signals LOCK, FREQ LOCK and PHA LOCK will be further discussed in paragraphs below.

Figure 3A:
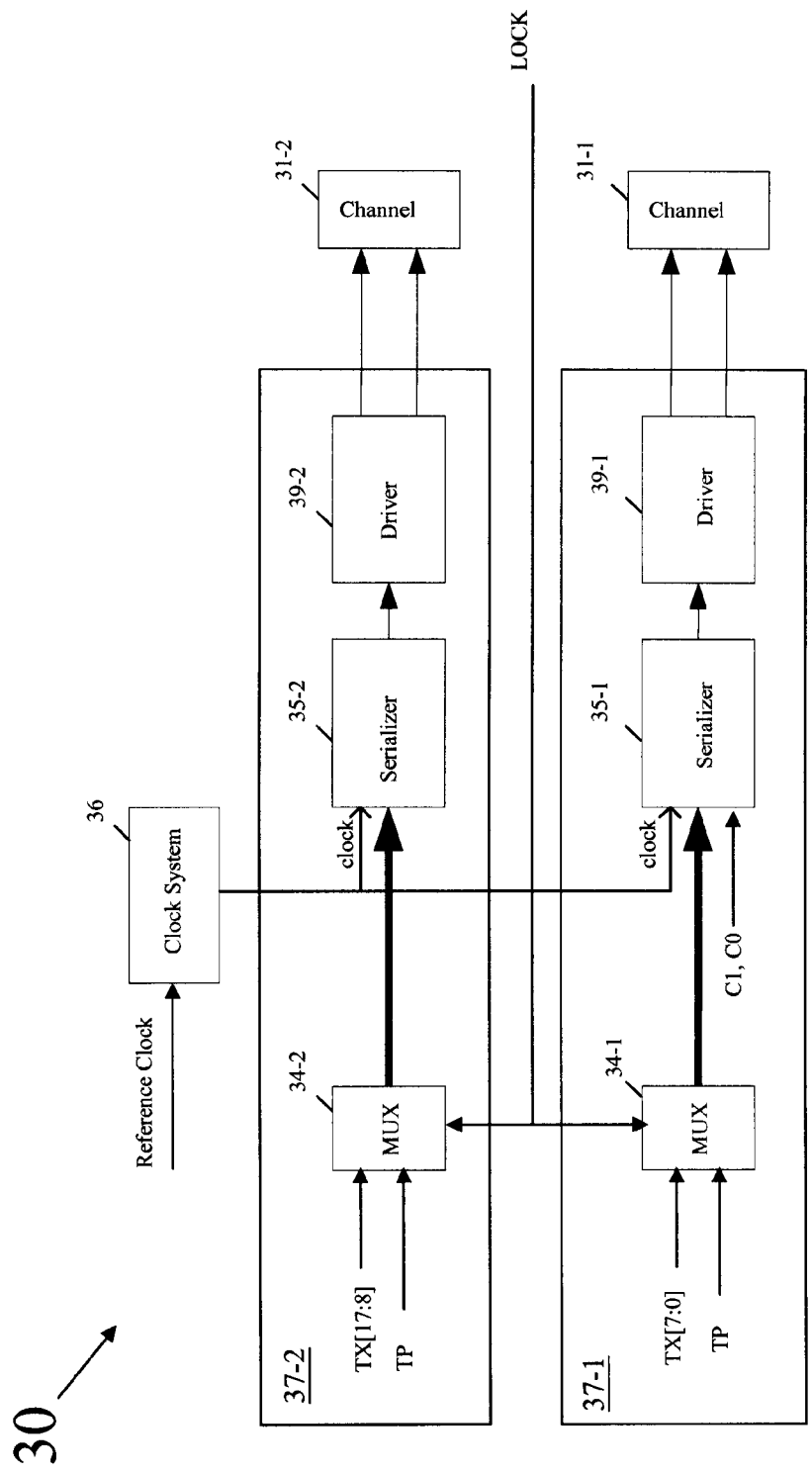
FIG. 3A is a schematic block diagram of some transmitter sets in the SERDES system illustrated in FIG. 2 consistent with an example of the present invention.

FIG. 3A is a schematic block diagram of some transmitter sets in the SERDES system 30 illustrated in FIG. 2 consistent with an example of the present invention. For the purpose of simplicity, only the transmitter sets 37-1 and 37-2 are shown. Referring to FIG. 3A, each of the transmitter sets 37-1 to 37-M of the SERDES system 30 may include a multiplexer, a serializer and a driver. Specifically, the transmitter set 37-1 may include a multiplexer 34-1, a serializer 35-1 and a driver 39-1. Similarly, the transmitter set 37-2 may include a multiplexer 34-2, a serializer 35-2 and a driver 39-2 and the transmitter set 37-M may include a multiplexer 34-M, a serializer 35-M and a driver 39-M. Each of the multiplexers 34-1 to 34-M may select between TP and data based on the signal LOCK from the detector 33. In one example according to the present invention, a logic "0" of the signal LOCK may represent at least one of a frequency out-of-lock state and a phase out-of-lock state, while a logic "1" may represent both a frequency in-lock state and a phase in-lock state. Furthermore, each of the multiplexers 34-1 to 34-M may select TP as an output in response to an out-of-lock state and select data as an output in response to an in-lock state. Each of the serializers 35-1 to 35-M may be, for example, another multiplexer, and may convert the parallel data or parallel training clocks from a corresponding one of the multiplexers 34-1 to 34-M into serial data based on the system clock from the clock system 36. Each of the drivers 39-1 to 39-M may be, for example, a low-voltage differential signaling (LVDS) device, and may then send differential serial data to a corresponding one of the channels 31-1 to 31-M.

In one example, one of the SERDES sets 30-1 to 30-M may serve as a reference SERDES set, of which the transmitter set and receiver set may be different in operation or structure from those of the remaining SERDES sets 30-1 to 30-M. For instance, in the present example, the SERDES set 30-1 is selected as a reference set. In the transmitter set 37-1 of the reference SERDES set 30-1, additional bits C1 and C0 including clock information may be added to the data. Specifically, a logic "1" bit C1 may be prefixed to the data and a logic "0" bit C0 may be postfixed to the data. The additional bits C1 and C0 may facilitate clock synchronization between the transmitter side and the receiver side. If the reference transmitter set 37-1 is able to process an n-bit input, n being a natural number, the remaining transmitter sets 37-2 to 37-M may be able to process an (n+2)-bit input because the additional bits C1 and C0 are not required in the remaining transmitter sets 37-2 to 37-M. In the present example as illustrated, in the reference transmitter set 37-1, 8-bit data including bit 0 to bit 7, denoted as TX [7:0], and the additional bits C1 and C0 are sent to the serializer 35-1, resulting in a 10-bit throughput. In the transmitter set 37-2, however, 10-bit data TX [17:8] free of any additional bits may be transmitted to the serializer 35-2. Given the same data throughput, the transmitter set 37-3 may transmit TX [27:18], the transmitter set 37-4 may transmit TX [37:28] and the transmitter set 37-M may transmit TX [17+10 (M−2): 8+10 (M−2)], for M being equal to or greater than 2. The value of M may vary as the capacity of the serializers 35-1 to 35-M varies. As compared to an 8B/10B encoding scheme that may be used in a conventional SERDES system, wherein additional two bits are added for every eight bits of data to be transmitted, the present invention may have significantly improved the actual data throughput rate.

Figure 3B:
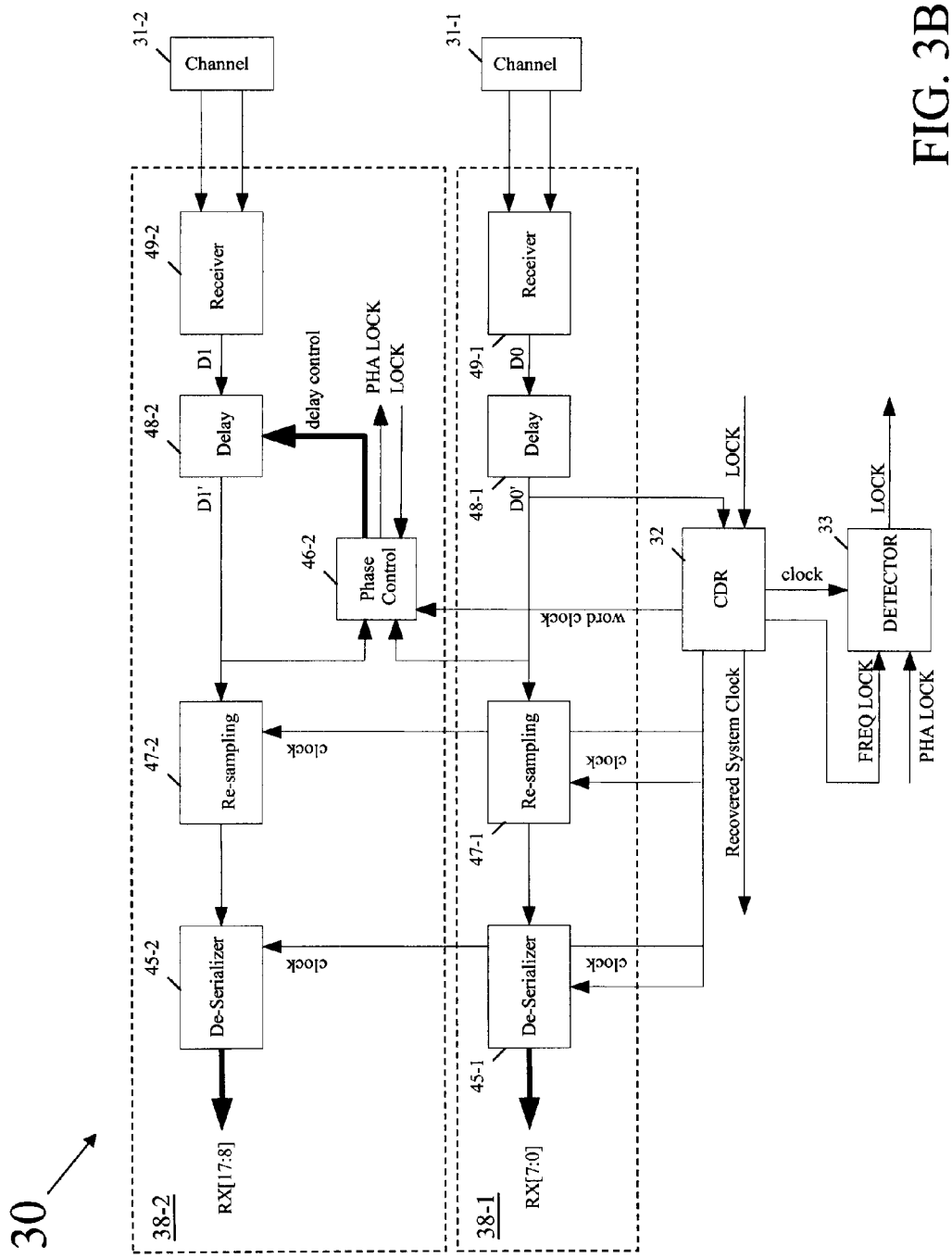
FIG. 3B is a schematic block diagram of some receiver sets in the SERDES system illustrated in FIG. 2 consistent with an example of the present invention.

FIG. 3B is a schematic block diagram of some receiver sets in the SERDES system 30 illustrated in FIG. 2 consistent with an example of the present invention. For the purpose of simplicity, only the receiver sets 38-1 and 38-2 are shown. Referring to FIG. 3B, each of the receiver sets 38-1 to 38-M of the SERDES system 30 may include a receiver, a delay circuit, a re-sampling circuit and a de-serializer. Specifically, the receiver set 38-1 may include a receiver 49-1, a delay circuit 48-1, a re-sampling circuit 47-1 and a de-serializer 45-1. Similarly, the receiver set 38-2 may include a receiver 49-2, the receiver set 38-M may include a receiver 49-M, a delay circuit 48-M, a re-sampling circuit 47-M and a de-serializer 45-M. Each of the receivers 49-1 to 49-M, which may include an LVDS device, may convert the differential serial data received from a corresponding one of the channels 31-1 to 31-M into serial data. Each of the delay circuits 48-1 to 48-M, which will be further described in paragraphs below, may be configured to address the issue of clock skew by calibrating in phase the serial data from a corresponding one of the receivers 49-1 to 49-M. Calibrated serial data may then sent to the re-sampling circuits 47-1 to 47-M, each of which may include at least one data flip flop (DFF), and the data may be re-sampled based on the clock signal from the CDR 32. Re-sampled serial data may be de-serialized based on the clock signal from the CDR 32 at the de-serializers 45-1 to 45-M, each of which may include a de-multiplexer, resulting in training patterns or parallel data RX [7:0], RX [17:8] to RX [17+10 (M−2): 8+10 (M−2)] for M being equal to or greater than 2.

In one example according to the present invention, the SERDES set 30-1 may serve as the reference SERDES set. The delay circuit 48-1 of the receiver set 38-1 of the reference SERDES set 30-1 may provide an output D0', which in turn may be sent to the CDR 32 to facilitate recovery of clock frequency or data frequency, and in turn may be sent to the receiver sets 38-2 to 38-M of the remaining SERDES sets 30-2 to 30-M for phase shift calibration, i.e., phase de-skew. Each of the receiver sets 38-2 to 38-M may further include a phase control circuit configured to calibrate the phase difference. As an example of the receiver set 38-2, a phase control circuit 46-2 may provide a control signal to the delay circuit 48-2 to compensate for the phase difference between an output D1' of the delay circuit 48-2 and the reference output D0' from the delay circuit 48-1. Each of the phase control circuits 46-2 to 46-M may provide the signal PHA LOCK to the detector 33 to indicate whether a phase lock state is reached. In one example, a logic "0" of the signal PHA LOCK may represent a phase out-of-lock state, while a logic "1" may represent a phase in-lock state. The delay circuits 48-1 to 48-M, the phase control circuits 46-2 to 46-M and the control signal will be further discussed in paragraphs below.

Figure 4A:
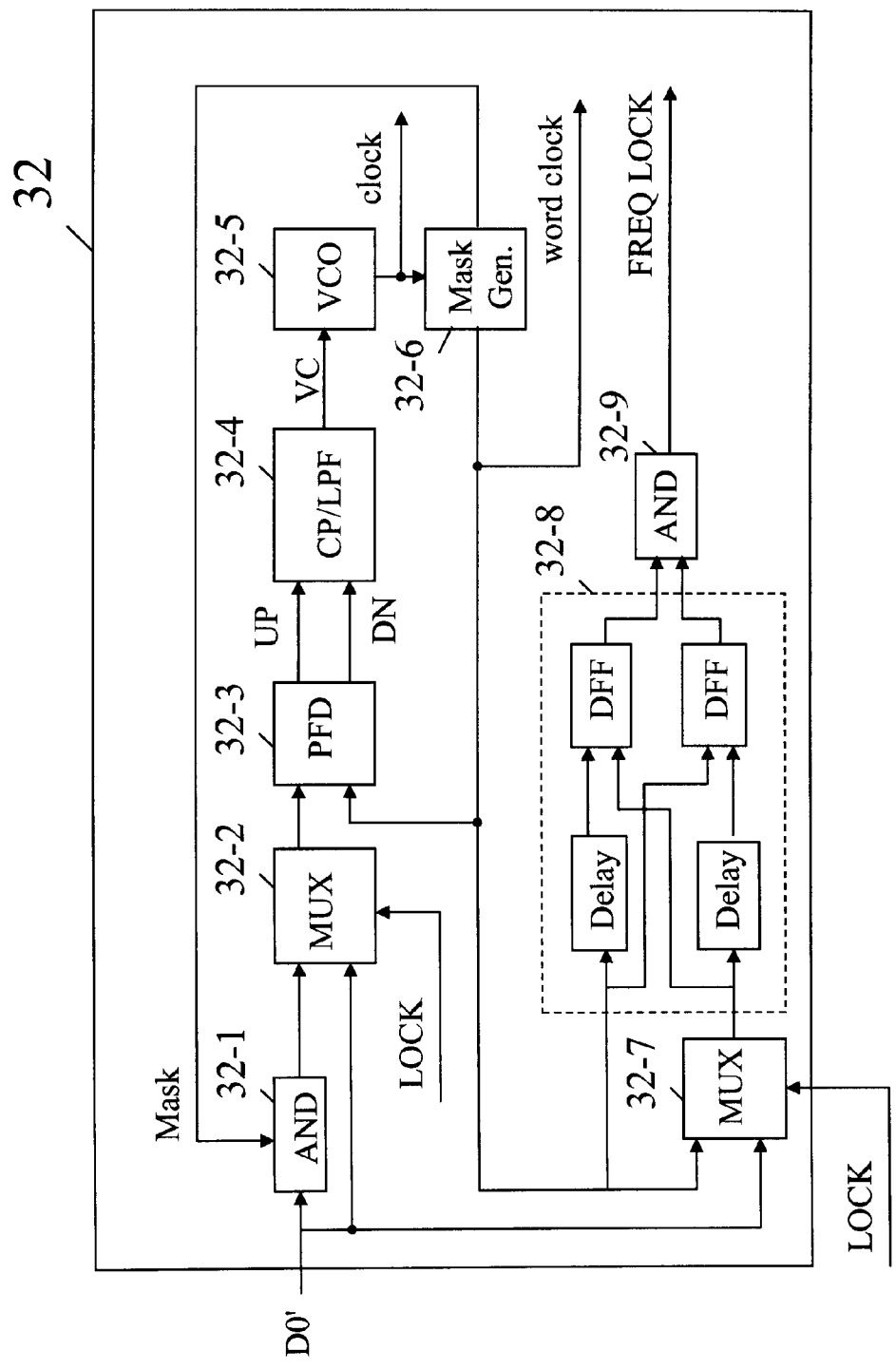
FIG. 4A is a block diagram of a clock/data recovery (CDR) of the SERDES system illustrated in FIG. 3B consistent with an example of the present invention.

FIG. 4A is a block diagram of the clock/data recovery (CDR) circuit 32 of the SERDES system 30 illustrated in FIG. 3B consistent with an example of the present invention. Referring to FIG. 4A, the CDR circuit 32 may include a first multiplexer 32-2, a phase and frequency detector (PFD) 32-3, a voltage-controlled oscillator (VCO) 32-5, a mask generator 32-6 and a second multiplexer 32-7. The CDR circuit 32 may also include a charge pump and low-pass filter (CP/LFF) circuit 32-4, a mask generator 32-6, a logic network 32-8, and an "AND" gate 32-9. The first multiplexer 32-3 may be configured to select between an output of a clock extractor 32-1 such as, for example, a logic "AND" gate, and the output D0' of the delay device 48-1 of the reference receiver 38-1 of FIG. 3B, based on the signal LOCK from the detector 33. In one example according to the present invention, a logic "0" of the signal LOCK may represent at least one of a frequency out-of-lock state and a phase out-of-lock state, while a logic "1" may represent both a frequency in-lock state and a phase in-lock state. Furthermore, before a frequency locked and phase locked state is reached, i.e., LOCK=0, training patterns may be transmitted, while after a frequency locked and phase locked state is reached, i.e., LOCK=1, actual data may be transmitted. The first multiplexer 32-2 may select D0' as an output in response to LOCK=0, wherein the data D0' includes a training pattern. On the other hand, the first multiplexer 32-2 may select the output of AND gate 32-1 as an output in response to LOCK=1, wherein the data D0' includes actual data and clock information C1 and C0.

Figure 4B:
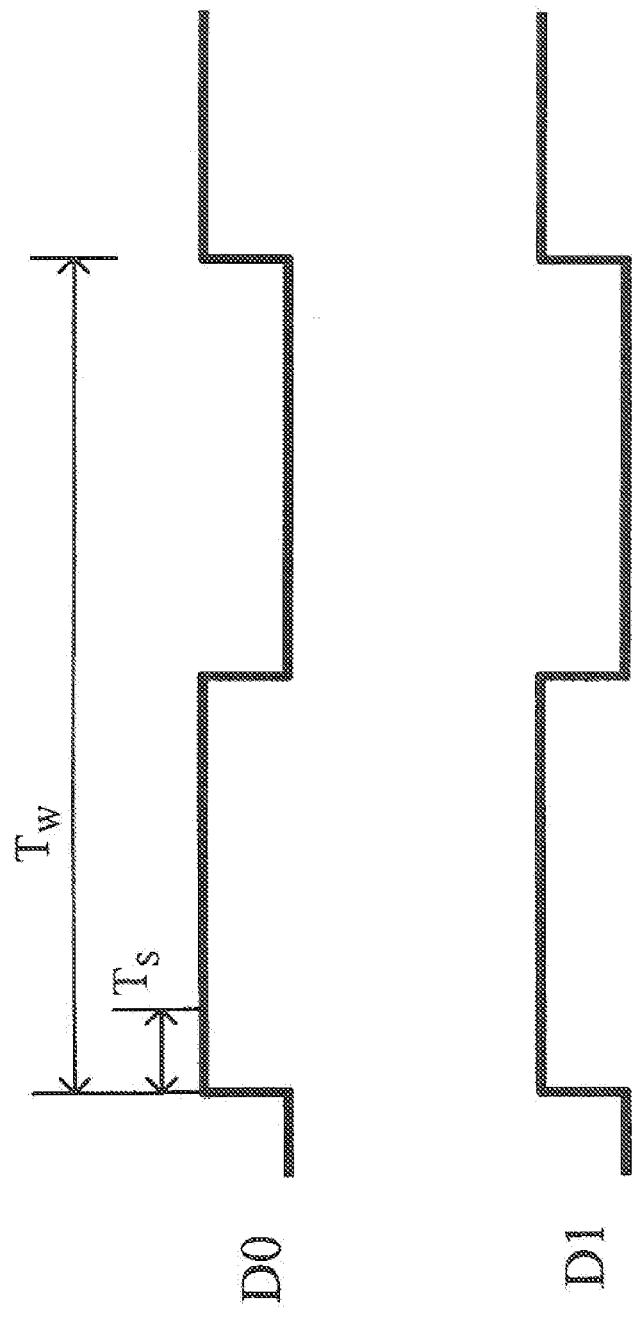
FIG. 4B is a waveform diagram of an exemplary training pattern.

FIG. 4B is a waveform diagram of an exemplary training pattern. Referring to FIG. 4B, when LOCK=0, D0 and D1 to be transmitted respectively from the transmitter sets 37-1 and 37-2 may include training patterns with word clock information, wherein the word clock may refer to a clock having a pulse width $T_W$ that is able to support the maximum data throughput of the SERDES system 30. The word clock signal may be provided by the mask generator 32-6 shown in FIG. 4A, based on the word clock information in the training patterns. The pulse width $T_W$ of the training pattern may be several times the pulse with $T_S$ of the system clock, depending on the maximum data throughput per channel.

Referring back to FIG. 4A, the PFD 32-3 may be configured to compare the difference in frequency and phase between the output of the first multiplexer 32-2 and a word clock from the mask generator 32-6, and generate signals "UP" and "DN", each of which may have a value that corresponds to the difference. In a charge pump (CP) and low-pass filter (LPF) circuit 32-4, the charge pump may receive the signals from the PFD 32-3 and in response may generate a current signal whose magnitude may depend on the values of the signals from the PFD 32-3. The low-pass filter may filter out the high frequency components of the current signal and send a voltage control signal "VC" to the VCO 32-5. The VCO 32-5 may change the "clock" signal and the word clock in frequency based on the voltage signal VC. Specifically, if the VCO 32-5 is running relatively slow, the signals from the PFD 32-3 may cause the charge pump to increase its output current until the VCO 32-5 achieves an oscillation frequency at which the clock signal is frequency-locked and phase-locked with the output of the first multiplexer 32-2. On the other hand, if the VCO 32-5 is running relatively fast, the signals from the PFD 32-3 may cause the charge pump to reduce its output current until the VCO 32-5 achieves an oscillation frequency at which the clock signal is frequency-locked and phase-locked with the output of the first multiplexer 32-2.

The second multiplexer 32-7 may be configured to select between the serial data D0' and the word clock based on the signal LOCK from the detector 33. In one example, before a frequency locked and phase locked state is reached, i.e., LOCK=0, the second multiplexer 32-7 may select D0' as an output. On the other hand, after a frequency locked and phase locked state is reached, i.e., LOCK=1, the second multiplexer 32-7 may select the word clock as an output. The word clock and an output of the second multiplexer 32-7 may be sent to a logic network 32-8 including delay elements (not numbered) and DFFs (not numbered). The signal FREQ LOCK provided by a logic "AND" gate 32-9 may be pulled high when the serial data D0' is frequency-locked with the word clock. The CDR 32 at the receiver side may therefore obtain the clock frequency information transmitted from the transmitter side and achieve a frequency in-lock state.

Figure 4C:
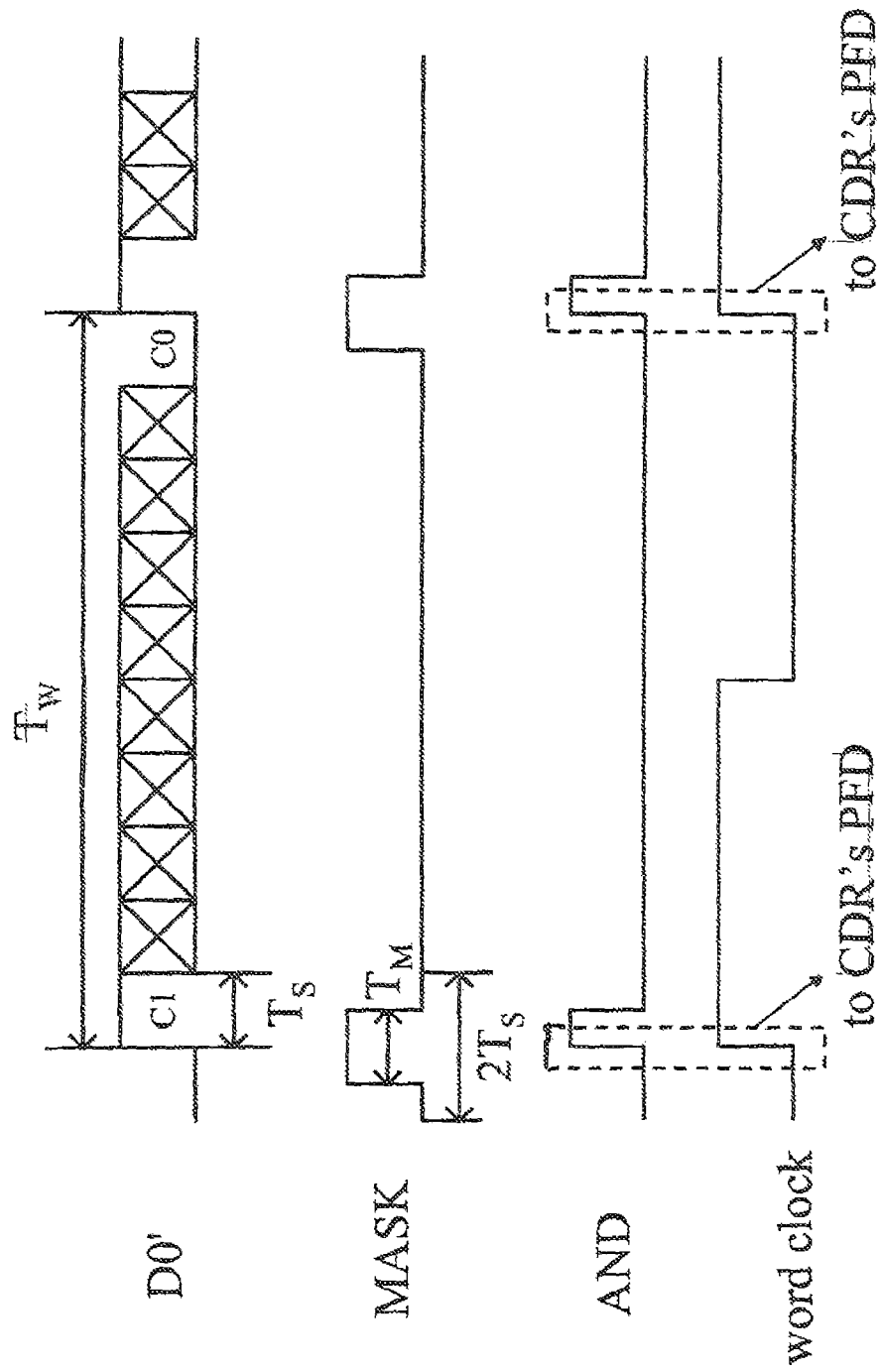
FIG. 4C are waveform diagrams illustrating a method of obtaining clock information consistent with an example of the present invention.

FIG. 4C are waveform diagrams illustrating a method of obtaining clock information consistent with an example of the present invention. Referring to FIG. 4C, once the frequency in-lock and phase in-lock state is reached, i.e., LOCK=1, the transmitter sets 37-1 to 37-M described and illustrated with respect to FIG. 3A may start to transmit actual data instead of training patterns. As has been previously described, the data D0' from the reference transmitter set 37-1 may include the additional bits C1 and C0, which include the clock information. A pulse signal "MASK" may be provided from the mask generator 32-6 to the clock extractor 32-1. In one example, the signal MASK may have a pulse width $T_M$ between one $T_S$ and two $T_S$, which may facilitate capturing a rising edge of the C1 bit when a logic AND operation is preformed at the clock extractor 32-1. The pulse width $T_W$ of the data D0' may then be identified by determining the width between immediately adjacent rising edges. The mask generator 32-6 may generate the word clock having the pulse width $T_W$.

Figure 4D:
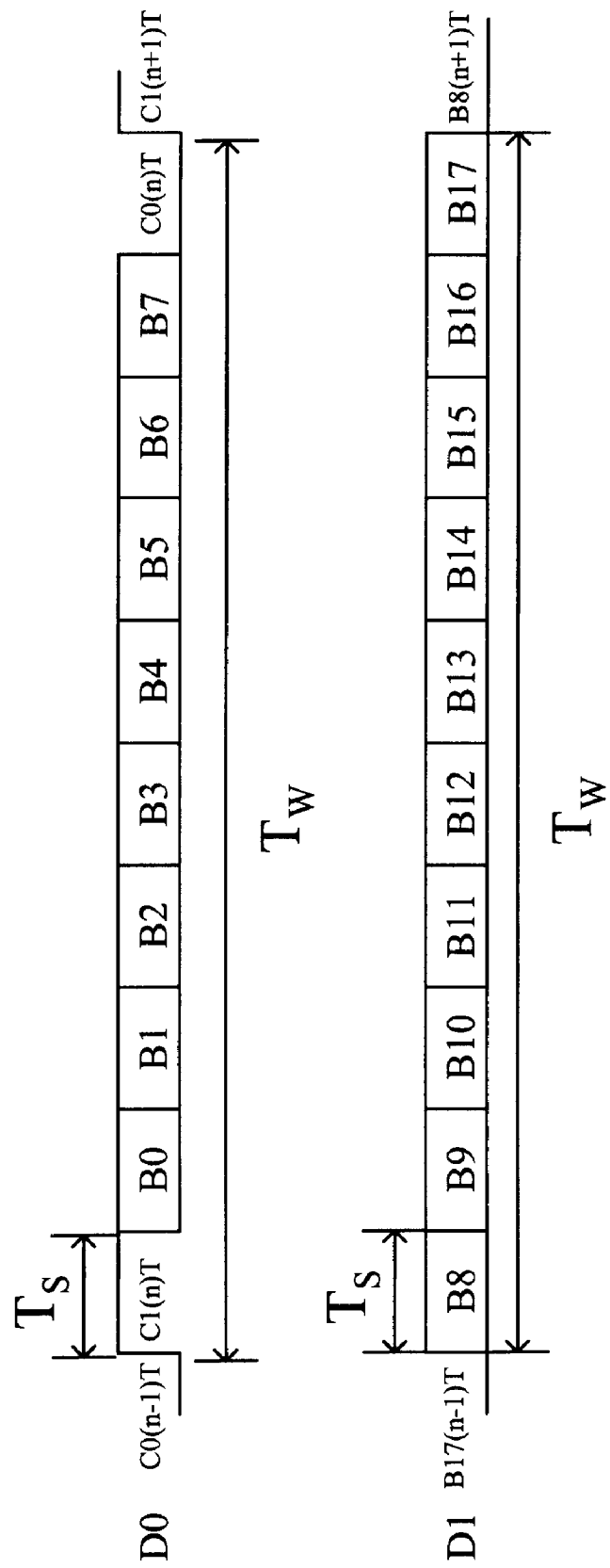
FIG. 4D are schematic diagrams of exemplary data transmission formats in the SERDES system illustrated in FIG. 3B.

FIG. 4D are schematic diagrams of exemplary data transmission formats in the SERDES system 30 illustrated in FIG. 3B. Referring to FIG. 4D, once the frequency in-lock and phase in-lock state is reached, i.e., LOCK=1, the transmitter sets 37-1 to 37-M described and illustrated with reference to FIG. 3A may start to transmit actual data instead of training patterns. Data D0 (TX [7:0]) to be transmitted from a reference transmitter set such as, for example, the transmitter set 37-1, may include clock information bits C1 and C0 in addition to data bits B0 to B7 in one clock cycle. The pulse widths $T_S$ and $T_W$ may be recovered in the CDR 32. In the remaining transmitter sets, for example, the transmitter set 37-2, Data D1 (TX [17:8]) may include data bits B8 to B17 free of the clock information bits C1 and C0.

Figure 5A:
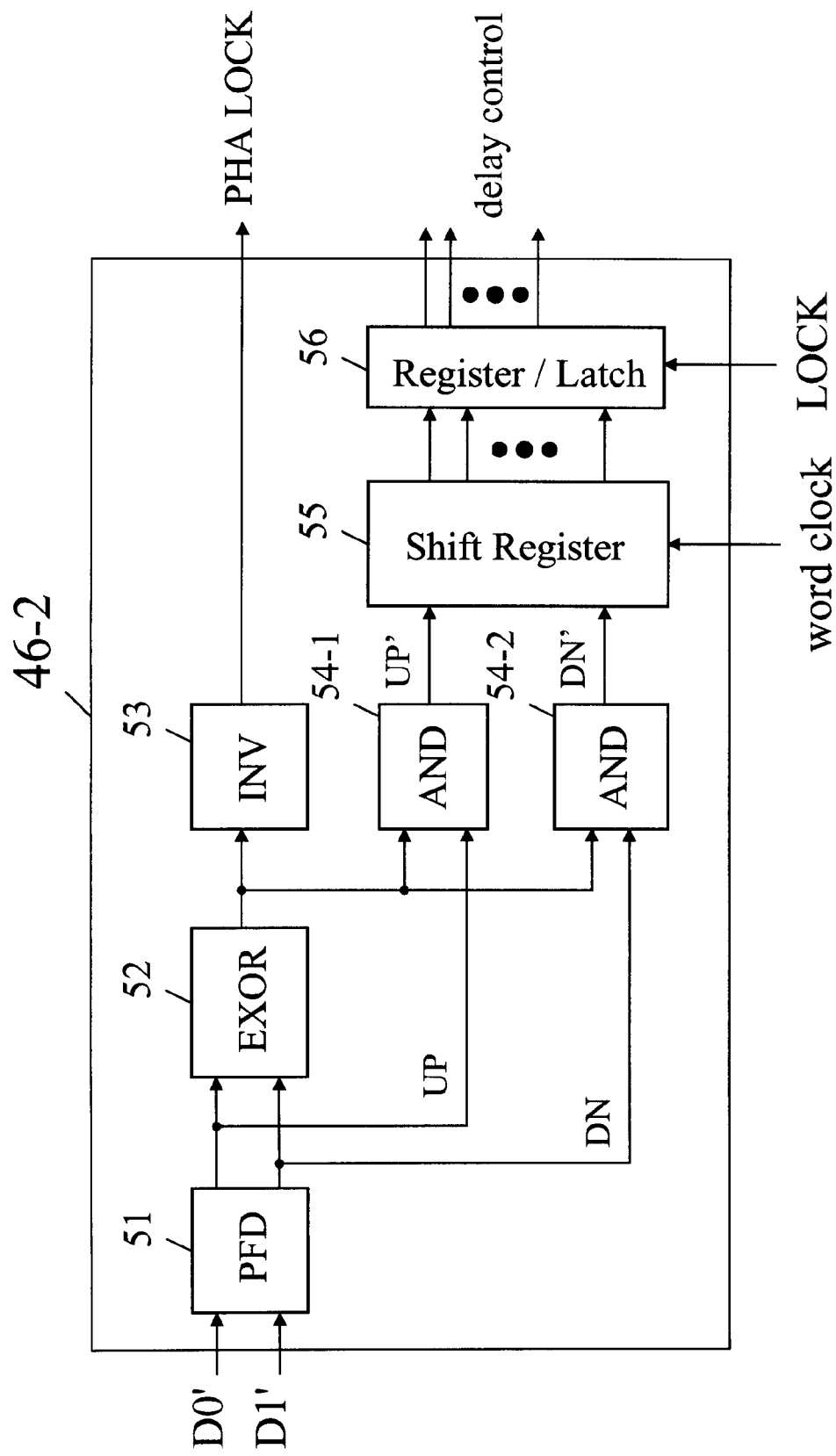
FIG. 5A is a block diagram of a phase control circuit of the SERDES system illustrated in FIG. 3B consistent with an example of the present invention.

FIG. 5A is a block diagram of the phase control circuit 46-2 of the SERDES system 30 illustrated in FIG. 3B consistent with an example of the present invention. Referring to FIG. 5A, the phase control circuit 46-2 may include a PFD 51, logic circuits 52, 53 and 54, a shift register 55 and a latch 56. The PFD 51 may compare the phase difference between D0' from the delay circuit 48-1 and D1' from the delay circuit 48-2, and provide signals UP and DN. If no phase difference exists, a logic exclusive-or (EXOR) gate 52 may output a logic "0", which in turn is inverted to a logic "1" by an inverter 53, resulting in a pulled-high signal PHA LOCK. The EXOR 52 and logic "AND" gates 54-1 and 54-2 in the exemplary circuit arrangement may remove reset pulses from the PFD 51. If a phase difference exists, the signal PHA LOCK is pulled low. Meanwhile, the shift register 55, which may be capable of overflow protection, may read outputs of the AND gates 54-1 and 54-2 based on the word clock from the CDR 32. The latch 56 may store the output of the shift register 55 and may not latch the count until LOCK=1. The latch 56 may provide a control code signal "delay control" to the delay circuit 48-2, which includes information regarding the amount of delay to be tuned for clock synchronization between D0' and D1'.

Figure 5B:
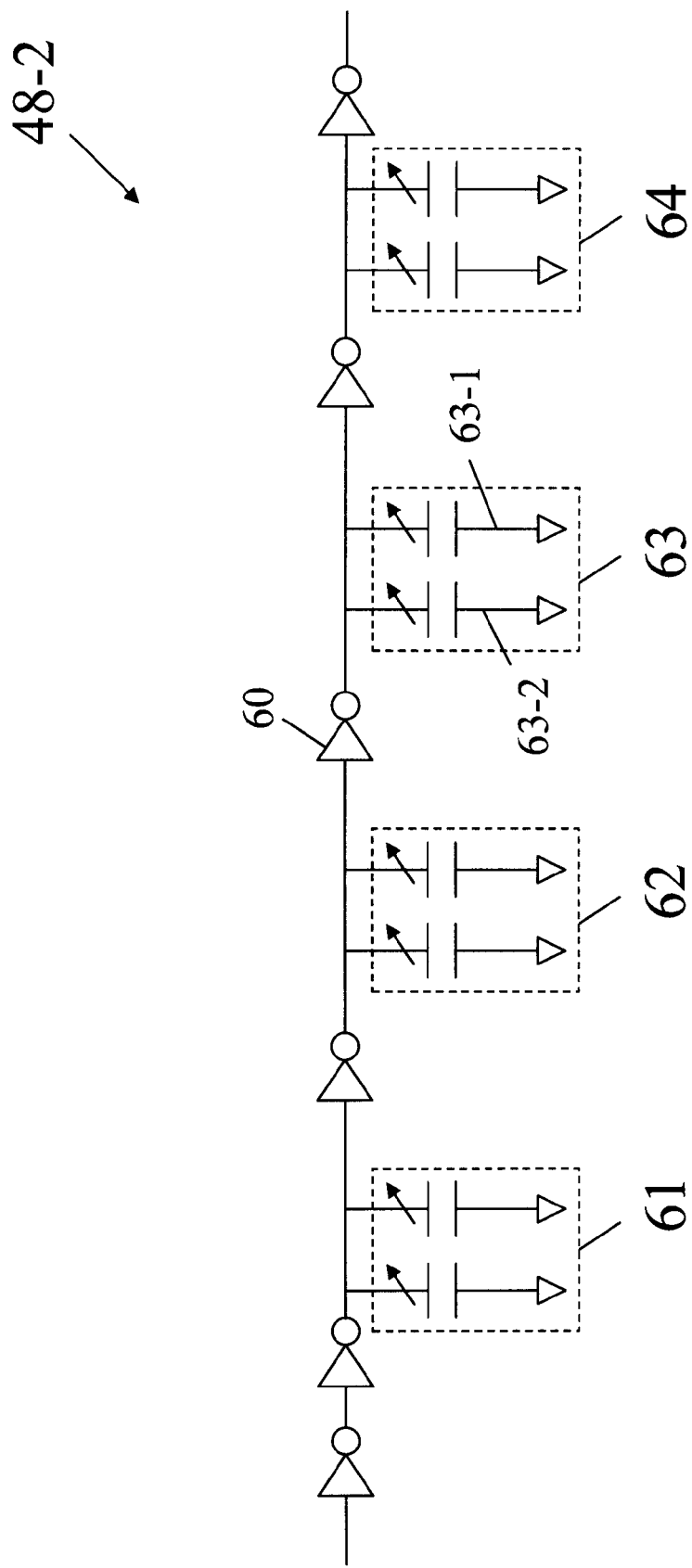
FIG. 5B is a schematic circuit diagram of a delay circuit of the SERDES system illustrated in FIG. 3B consistent with an example of the present invention.

FIG. 5B is a schematic circuit diagram of the delay circuit 48-2 of the SERDES system 30 illustrated in FIG. 3B consistent with an example of the present invention. Referring to FIG. 5B, the delay circuit 48-2 may include cells 61, 62, 63, and 64 and an even number of inverters 60. Each of the cells 61-64, as an example of the cell 63, may include a first capacitor 63-1 and a second capacitor 63-2. In the present example, the first capacitor 63-1 and the second capacitor 63-2 may be coupled in parallel with one another. In another example, the first capacitor 63-1 and the second capacitor 63-2 may be coupled serially. Each of the capacitors 63-1 and 63-2 may include a variable capacitor or varactor. Furthermore, the second capacitor 63-2 may be configured to provide, for example, twice the capacitance as the first capacitor 63-1. The control signal from the phase control circuit 46-2 in one example may include a 4-bit control code. The 4-bit control code may include two most significant bits (MSBs) to select among the cells 61 to 64 and two least significant bits (LSBs) to select the desired capacitances in the selected capacitors and in turn the desired amount of delay. For example, one cell 61 may be selected if the two most significant bits are 00, and all of the four cells 61 to 64 may be selected if they are 11. Furthermore, no capacitive load may be provided if the two least significant bits are 00, and both capacitors 63-1 and 63-2 may be selected if they are 11. The relationship between the value of the control code and the cells and capacitive loadings selected is summarized below in Table 1.

TABLE 1

| Two MSBs | Cells Selected | Two LSBs | Capacitors Selected |
|---|---|---|---|
| 00 | Cell 61 | 00 | none |
| 01 | Cells 61 and 62 | 01 | Capacitor 63-1 |
| 10 | Cells 61, 62 and 63 | 10 | Capacitor 63-2 |
| 11 | Cells 61, 62, 63 and 64 | 11 | Capacitors 63-1 and 63-2 |

Figure 6:
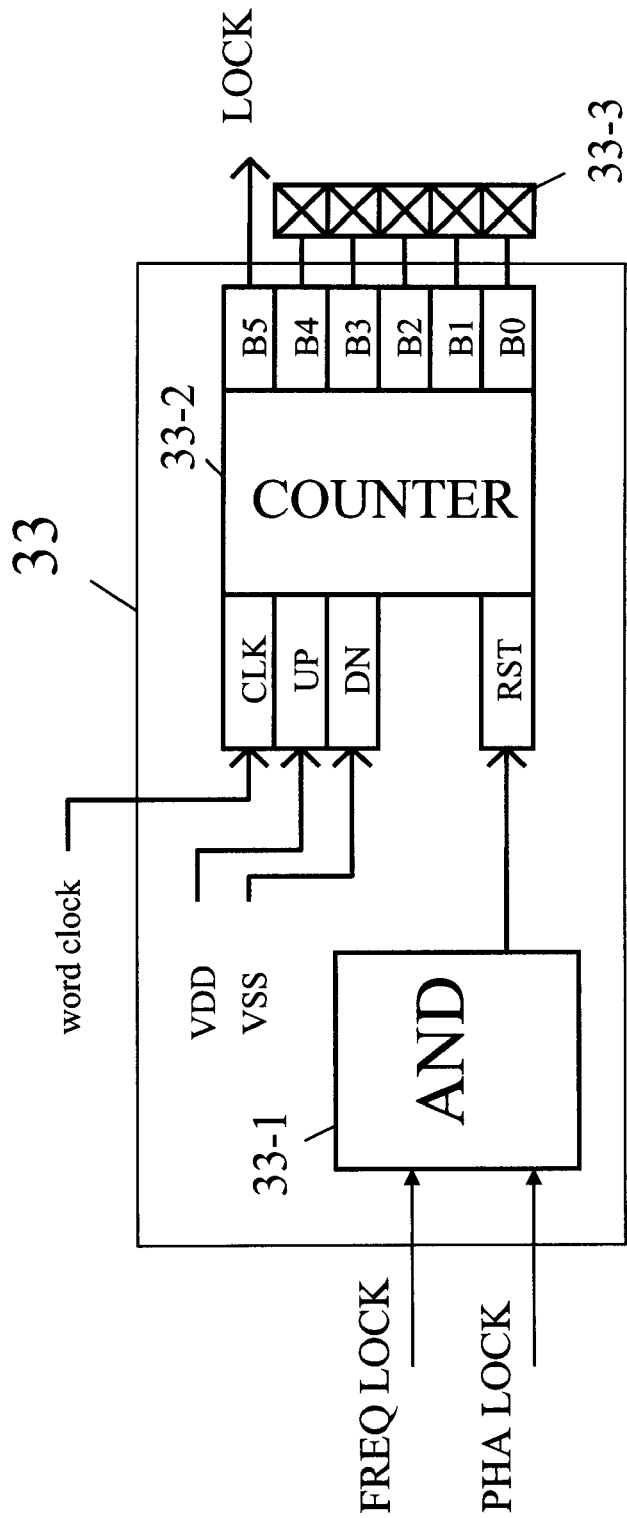
FIG. 6 is a schematic diagram of a detector of the SERDES system illustrated in FIG. 3B consistent with an example of the present invention.

FIG. 6 is a schematic diagram of the detector 33 of the SERDES system 30 illustrated in FIG. 3B consistent with an example of the present invention. Referring to FIG. 6, the detector 33 may include a logic "AND" gate 33-1 and a counter 33-2. The counter 33-2 may include pins "UP" and "DN" respectively coupled to VDD and VSS, a pin "CLK" to receive the word clock from the CDR 32, and a pin "RST" coupled to an output of the AND gate 33-1. In one example, before a frequency in-lock and phase in-lock state is reached, i.e., either FREQ LOCK=0 or PHA LOCK=0 or both, the counter 33-2 may be reset by a logic "0" output of the AND gate 33-1. After a frequency in-lock and phase in-lock state is reached, i.e., both FREQ LOCK=1 and PHA LOCK=1, the signal LOCK may be pulled high and the counter 33-2 may start to count. In the present example, the counter 33-2 may provide a 6-bit output with bits B0 to B5 being coupled to open contacts 33-3 and a bit B6 to serve the signal LOCK. In the arrangement, the counter 33-2 may be able to count to 32 word clock cycles before the "LOCK" bit is active.

Figure 7:
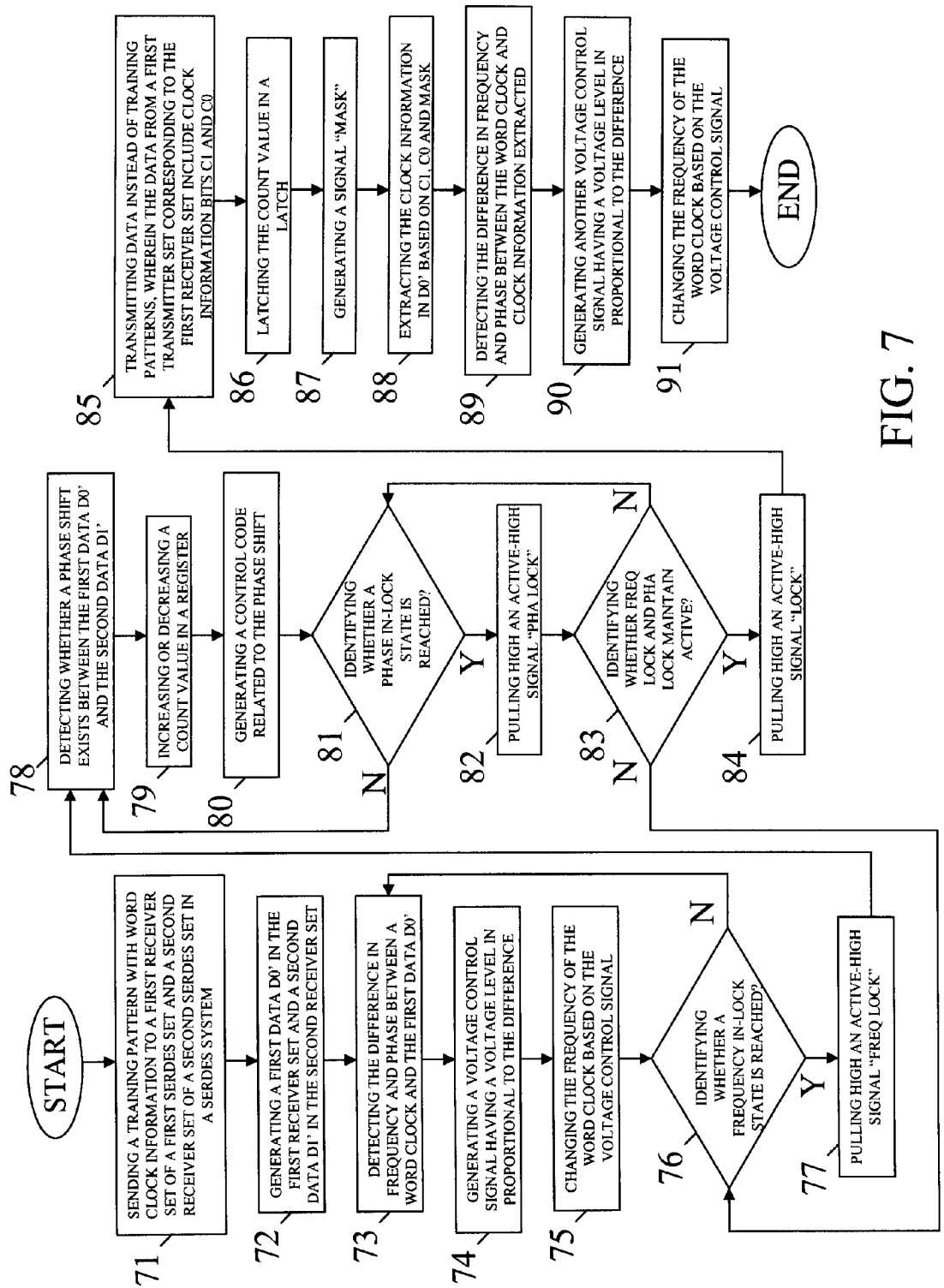
FIG. 7 is a flow diagram illustrating a method of operating the SERDES system illustrated in FIGS. 3A and 3B.

FIG. 7 is a flow diagram illustrating a method of operating the SERDES system 30 illustrated in FIGS. 3A and 3B. Referring to FIG. 7, at step 71, a training pattern with clock information may be sent to a first receiver set of a first SERDES set and a second receiver set of a second SERDES set in a SERDES system. The clock information may include, for example, the pulse widths of a master clock and a word clock at the transmitter side. The first SERDES set may serve as a reference SERDES set and the first receiver set in turn may serve as a reference receiver set to facilitate recovery of clock and de-skew of phase shift. At step 72, a first data D0' may be generated in the first receiver set and a second data D1' may be generated in the second receiver set. The data D0' and D1' still include the clock information to be extracted at the receiver side. Next, at step 73, the difference in frequency and phase between the first data D0' from the reference first receiver set and a word clock from a CDR may be detected by, for example, a PFD of the CDR at the receiver side. A voltage control signal VC having a voltage level in proportional to the difference may be generated at step 74 by, for example, a charge pump and low-pass filter circuit of the CDR. At step 75, the word clock from the CDR may be changed in frequency based on the voltage signal VC by, for example, a VCO. The VCO may also generate a clock signal and change the frequency of the clock signal based on the voltage control signal VC so that the clock signal is frequency-locked with the master clock and the word clock at the receiver side is frequency-locked with the word clock at the transmitter side. That is, the master clock and word clock are recovered at the receiver side. Next, at step 76, it may be identified whether a frequency in-lock state is reached. If not, the steps 73 to 75 may be repeated. If confirmative, an active high signal FREQ LOCK may be pulled high at step 77. The signal FREQ LOCK may then be sent to a detector such as the detector 33 described and illustrated with reference to FIG. 6. The steps 71 to 77 may refer to a clock recovery process.

At step 78, it may be detected whether a phase shift exists between the first data D0' and the second data D1' by, for example, a phase control circuit. A count value of a register such as, for example, a shift register with parallel outputs in the phase control circuit, may be increased or decreased at step 79 based on the amount of the phase difference detected. Next, at step 80, a control code related to the amount of phase shift may be generated by, for example, a latch in the phase control circuit. The control code may be sent to a delay circuit in the second receiver set. The delay circuit may be configured to compensate for the phase shift so that the second data D1' in the second receiver set may be phase-locked with the first data D0' in the reference first receiver set. At step 81, it may be detected whether a phase in-lock state is reached. If not, the steps 78 to 80 may be repeated. If confirmative, at step 82, an active high signal PHA LOCK may be pulled high. The signal PHA LOCK may then be sent to the detector 33. The steps 78 to 82 may refer to a de-skew process. Skilled persons in the art will understand that the de-skew process of steps 78 to 82 may be simultaneous with the clock recovery process of steps 71 to 77.

Next, at step 83, it may be detected whether the signals FREQ LOCK and PHA LOCK maintain active. If not, the steps 76 and 81 may be repeated. If confirmative, at step 84, an active high signal LOCK may be pulled high. The signal LOCK may be sent to a first transmitter set and a second transmitter set corresponding to the first receiver set and the second receiver set, respectively. Once the signal LOCK is active, a data transmission process may be triggered at step 85. The data to be transmitted from the first transmitter set may include data bits sandwiched by additional bits C1 and C0 in one word clock cycle. The bits C1 and C0 may include clock information. Also, the signal LOCK may be sent to the phase control circuit to "latch" the count in the latch at step 86 when LOCK is active. Furthermore, the signal LOCK may be sent to the CDR. The CDR generates a pulse signal MASK having a pulse width greater than one master clock pulse width and smaller than two word clock pulse widths at step 87. When LOCK is active, at step 88, the clock information may be extracted based on C1, C0 and the pulse signal MASK. Next, at step 89, the difference in frequency and phase between the word clock and the extracted clock information may be detected. At step 90, another voltage control signal having a voltage level in proportional to the difference may be generated. Next, the clock signal and word clock may be changed in frequency at step 91.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A data communication system comprising:
a first transmitter set configured to transmit a first output based on a first signal, the first output including one of a training pattern and a first data, the training pattern and the first data including clock information;
a second transmitter set configured to transmit a second output based on the first signal, the second output including one of the training pattern and a second data;
a first receiver set configured to generate a first received data based on the first output;
a second receiver set configured to generate a second received data based on the second output;
a clock and data recovery (CDR) circuit configured to extract the clock information based on the first signal and the first received data and provide a second signal indicating whether a frequency in-lock status is reached;
a phase control circuit in the second receiver set, the phase control circuit being configured to detect a phase difference between the first received data and the second received data and provide a third signal indicating whether a phase in-lock status is reached; and
a detector configured to generate the first signal based on the second signal and the third signal.

2. The system of claim 1, wherein the first transmitter set includes a multiplexer configured to select between the training pattern and the first data based on the first signal, and the second transmitter set includes a multiplexer configured to select between the training pattern and the second data based on the first signal.

3. The system of claim 1, wherein the clock information includes at least one of the pulse width of a master clock or the pulse width of a first word clock, the first word clock comprising a number of master clock cycles in one clock cycle.

4. The system of claim 1, wherein the CDR circuit comprises:
a pulse generator configured to generate a pulse signal and a second word clock based on the pulse signal and the first received data;
a clock extractor configured to detect a rising edge of the first received data in one clock cycle based on the pulse signal; and
a first multiplexer configured to select between the first received data and an output of the clock extractor based on the first signal.

5. The system of claim 4, wherein the CDR further comprises:

a phase and frequency detector (PFD) configured to detect a difference between an output of the first multiplexer and the second word clock; and
a voltage controlled oscillator (VCO) configured to adjust the second word clock in frequency based on the difference.

6. The system of claim 4, wherein the CDR further comprises:
a second multiplexer configured to select between the first received data and the second word clock based on the first signal; and
a logic circuit network configured to change the state of the second signal based on an output of the second multiplexer and the second word clock.

7. The system of claim 4, wherein the pulse width of the pulse signal is equal to or greater than one fold of the pulse width of the mater clock and smaller than two folds of the pulse width of the master clock.

8. The system of claim 1, wherein the first data includes a number of N data bits sandwiched between a first clock bit and a second clock bit in one clock cycle, and the second data includes a number of (N+2) data bits in the same clock cycle, N being a natural number.

9. The system of claim 8, wherein the first clock bit has a logic "1" value and the second clock bit has a logic "0" value.

10. The system of claim 1, wherein the phase control circuit comprises:
a PFD configured to detect a difference in phase between the first received data and the second received data; and
a logic circuit network configured to change the state of the third signal based on the difference.

11. The system of claim 10, wherein the phase control circuit further comprises:
a shift register configured to provide a count value in accordance with the difference based on the second word clock; and
a latch configured to register the count value based on the first signal and provide a control code when the first signal is active.

12. The system of claim 11, wherein the second receiver set includes a delay circuit, the delay circuit being configured to provide an amount of delay in accordance with the control code.

13. The system of claim 12, wherein the delay circuit includes a number of cells, each of the cells comprising:
a first capacitive load having a first capacitance value; and
a second capacitive load having a second capacitance value.

14. The system of claim 13, wherein the control code includes a first portion to select among the number of cells, and a second portion to select among the first and second capacitive loads of at least one of the cells selected.

15. A data communication system comprising:
a number of serializer de-serializer (SERDES) sets each including a transmitter set further comprising a serializer and a receiver set further comprising a de-serializer;
a first transmitter set of a first SERDES set, the first transmitter being configured to transmit one of a training pattern and a first data, the training pattern and the first data including clock information;
a second transmitter set of each of the remaining SERDES sets, the second transmitter set being configured to transmit one of the training pattern and a second data;
a first receiver set of the first SERDES set corresponding to the first transmitter set, the first receiver set including a first delay circuit being configured to generate a first delayed data based on the one of the training pattern and the first data;

a second receiver set of each of the remaining SERDES sets corresponding to the second transmitter set, the second receiver set including a second delay circuit being configured to generate a second delayed data based on the one of the training pattern and the second data;

a clock and data recovery (CDR) circuit configured to extract the clock information based on the first delayed data; and a phase control circuit in the second receiver set, the phase control circuit being configured to detect a phase difference between the first delayed data and the second delayed data and provide a control code to the second delay circuit based on the phase difference.

16. The system of claim 15, wherein the first transmitter set includes a multiplexer configured to select between the training pattern and the first data, and the second transmitter set includes a multiplexer configured to select between the training pattern and the second data.

17. The system of claim 15, wherein the clock information includes at least one of the pulse width of a master clock or the pulse width of a first word clock, the first word clock comprising a number of master clock cycles in one clock cycle.

18. The system of claim 15, wherein the CDR circuit comprises:
a pulse generator configured to generate a pulse signal and a second word clock based on the pulse signal and the first delayed data;
a clock extractor configured to detect a rising edge of the first delayed data in one clock cycle based on the pulse signal; and
a first multiplexer configured to select between the first delayed data and an output of the clock extractor.

19. The system of claim 18, wherein the CDR further comprises:
a phase and frequency detector (PFD) configured to detect a difference between an output of the first multiplexer and the second word clock; and
a voltage controlled oscillator (VCO) configured to adjust the second word clock in frequency based on the difference.

20. The system of claim 18, wherein the CDR further comprises:
a second multiplexer configured to select between the first delayed data and the second word clock; and
a logic circuit network configured to generate a signal indicating whether a frequency-locked status is reached.

21. The system of claim 15, wherein the first data includes a number of N data bits sandwiched between a first clock bit having a first logic value and a second clock bit having a second logic value in one clock cycle, the first and second logic values being different from one another, and the second data includes a number of (N+2) data bits in the same clock cycle, N being a natural number.

22. The system of claim 15, wherein the phase control circuit comprises:
a PFD configured to detect a difference in phase between the first delayed data and the second delayed data; and
a logic circuit network configured to generate a signal based on the difference, the signal indicating whether a phase-locked status is reached.

23. The system of claim 15, wherein each of the first and second delay circuits includes a number of cells, each of the cells comprising:

a first capacitive load having a first capacitance value; and
a second capacitive load having a second capacitance value.

24. The system of claim 23, wherein the control code includes a first portion to select among the number of cells, and a second portion to select among the first and second capacitive loads of at least one of the cells selected.

25. A data communication system comprising:
a first transmitter set configured to transmit a first output including one of a training pattern and a first data, the training pattern and the first data including clock information;
a second transmitter set configured to transmit a second output including one of the training pattern and a second data;
a first receiver set comprising:
a first receiver configured to receive the first output; and
a first delay circuit configured to generate a first delayed data; and
a second receiver set comprising:
a second receiver configured to receive the second output;
a second delay circuit configured to generate a second delayed data; and
a phase control circuit configured to detect a phase difference between the first delayed data and the second delayed data and provide a control code to the second delay circuit based on the phase difference.

26. The system of claim 25, wherein the clock information includes at least one of the pulse width of a master clock or the pulse width of a first word clock, the first word clock comprising a number of master clock cycles in one clock cycle.

27. The system of claim 25 further comprising a clock and data recovery (CDR) circuit configured to extract the clock information based on the first delayed data.

28. The system of claim 26, wherein the CDR circuit comprises:
a pulse generator configured to generate a pulse signal and a second word clock based on the pulse signal and the first delayed data;
a clock extractor configured to detect a rising edge of the first delayed data in one clock cycle based on the pulse signal; and
a first multiplexer configured to select between the first delayed data and an output of the clock extractor.

29. The system of claim 28, wherein the CDR further comprises:
a phase and frequency detector (PFD) configured to detect a difference between an output of the first multiplexer and the second word clock; and
a voltage controlled oscillator (VCO) configured to adjust the second word clock in frequency based on the difference.

30. The system of claim 28, wherein the CDR further comprises:
a second multiplexer configured to select between the first delayed data and the second word clock; and
a logic circuit network configured to generate a signal indicating whether a frequency-locked status is reached.

31. The system of claim 25, wherein the first data includes a number of N data bits sandwiched between a first clock bit and a second clock bit in one clock cycle, and the second data includes a number of (N+2) data bits in the same clock cycle, N being a natural number.

32. The system of claim 25, wherein the phase control circuit comprises:

a PFD configured to detect a difference in phase between the first delayed data and the second delayed data; and a logic circuit network configured to generate a signal based on the difference, the signal indicating whether a phase-locked status is reached.

33. The system of claim 25, wherein each of the first and second delay circuits includes a number of cells, each of the cells comprising:

a first capacitive load having a first capacitance value; and a second capacitive load having a second capacitance value.

34. The system of claim 33, wherein the control code includes a first portion to select among the number of cells, and a second portion to select among the first and second capacitive loads of at least one of the cells selected.

* * * * *